July 2, 1929.  A. T. WATSON  1,719,152
COMBINED LIQUID PRESSURE CONTROLLER AND SANITARY CLEANSING APPARATUS
Filed Nov. 28, 1928
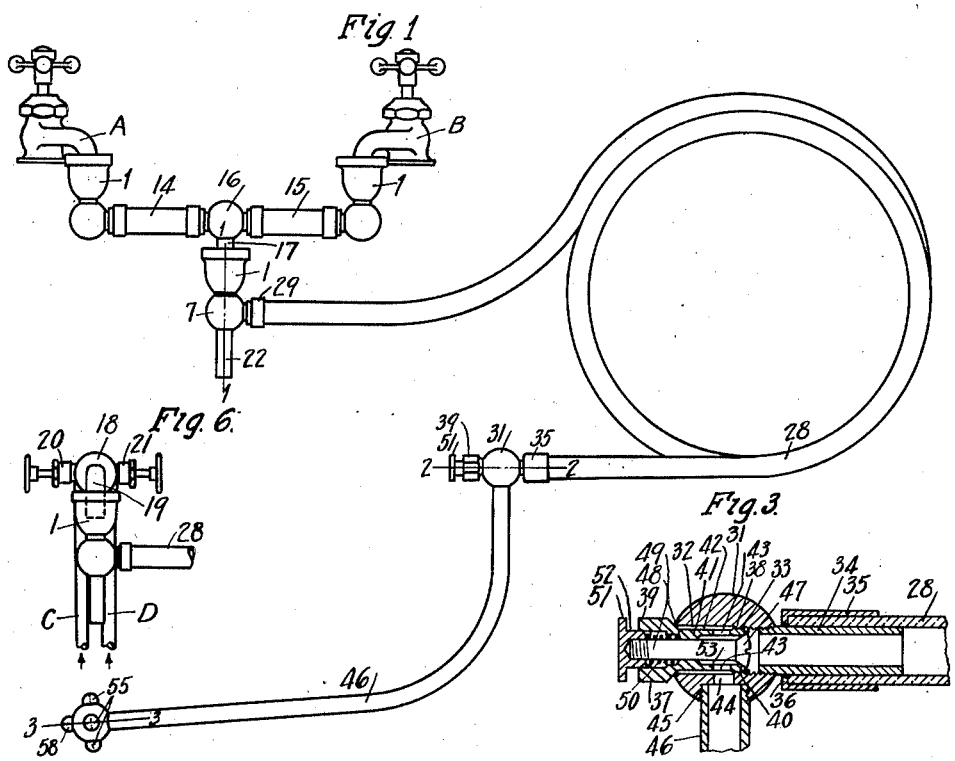
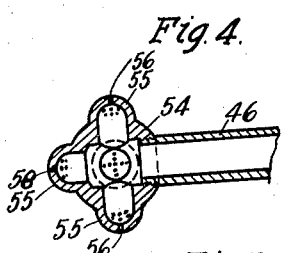
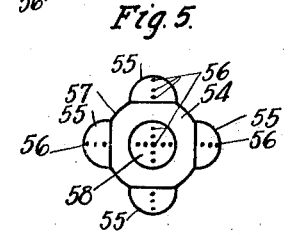
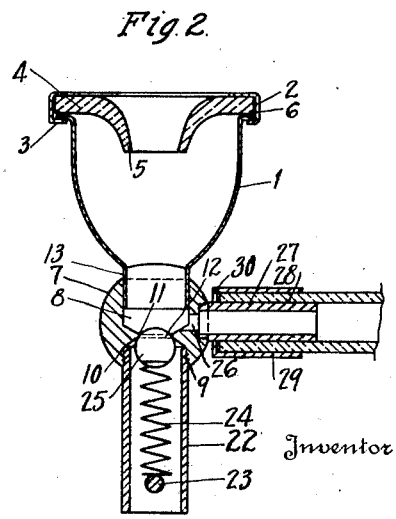

Patented July 2, 1929.

1,719,152

UNITED STATES PATENT OFFICE.

ARTHUR TOD WATSON, OF MANSFIELD, OHIO, ASSIGNOR OF ONE-HALF TO BERNARD R. RIDENOUR, OF MANSFIELD, OHIO.

COMBINED LIQUID-PRESSURE CONTROLLER AND SANITARY CLEANSING APPARATUS.

Application filed November 28, 1928. Serial No. 322,370.

This invention relates to a combined liquid pressure controller and sanitary apparatus.

The primary object of the invention is to provide an apparatus that will thoroughly cleanse and irrigate abdominal organs and cavities in the body to insure internal cleansing and also provide means of thoroughly irrigating and cleansing affected external parts of the body for sanitary purposes.

Another object of the invention is to provide means for regulating and controlling the pressure in domestic water service or the like to any desired pressure.

Another object of the invention is to provide means for a continuous and constant flow or stream of liquid under a pre-determined pressure to a vent or outlet of a nozzle.

Another object of the invention is to provide an apparatus that will automatically stop the flow of water or other liquid therethrough or permit the continuous passage thereof through the apparatus at the will of the user.

Another object of the invention is to provide an apparatus that is simple in operation and that can be constructed with a minimum amount of labor and material.

These and other objects are obtained by the mechanism illustrated in the accompanying drawing in which:

Figure 1 is a side elevation of the assembled device showing it applied to hot and cold water faucets applied to a lavatory, bath tub, or the like.

Figure 2 is a longitudinal section of the means for attaching the apparatus to a spout of a faucet, a ball valve and a by-pass, taken on the line 1—1 of Fig. 1.

Figure 3 is a longitudinal section of a pressure relief valve used in the assembly of the apparatus taken on the line 2—2 of Fig. 1. It also shows the inlet of the liquid supply and the means for conducting the liquid to a nozzle.

Figure 4 is a cross sectional view of the nozzle that is connected to the apparatus taken on the line 3—3 of Fig. 1.

Figure 5 is an end view of the nozzle.

Figure 6 is a side elevation showing the apparatus attached to the spout of a conventional type of a mixing valve.

It is well known that the pressure of water delivered from various water works for domestic uses varies in pressure and that the pressure ordinarily is too great to be used for douches or the like or to be applied to the abdominal organs and cavities or other affected parts of the body for irrigation and sanitary purposes, so that the pressure flowing from the spout of a faucet must be controlled and held at a definite pre-determined pressure to provide comfort, convenience, and safety for the user in applying water or other liquid, so as to not subject the parts of the body to undue pressure, distortion or injury resulting from too great a pressure of the flow of liquid on the affected parts of the body.

Referring to the means employed to fasten and hold the apparatus to the spout of a faucet or the like (see Fig. 2), preparatory to using the apparatus for the purpose intended, means are employed which consist of a cup-shaped member 1 having a peripheral flange 2 formed at its open end providing a shoulder 3 on the upper portion of the cup-shaped member. An annular washer 4 made preferably of rubber or the like, having its central portion tapered and down-turned as shown at 5, is supported on the shoulder 3 and is held in place by an annular ring member 6 having inwardly extending flanges which are adapted to fit over the washer and the shoulder 3. The upper inwardly extending flange of the ring member is beaded so as to securely hold the washer 4 in place.

A body member 7 is provided and preferably formed spherically in shape. An aperture 8 is formed in the spherical member 7 to a pre-determined depth and in opposed relation thereto, and an aperture 9 is formed in the spherical member leaving a margin 10 of the stock of the spherical member interposed between the opposed apertures. A valve seat 11 is provided on the lower portion of the margin 10 of the stock. An aperture 12 is formed in the central portion of the margin and communicates with the aperture 8. The cup-shaped member 1 has its end 13 fitted to the aperture 8 in the spherical member 7 extending into said aperture to a pre-determined depth, which leaves a space between the end thereof and the margin 10 of the stock of the spherical member 7.

When it is desired to attach the apparatus to the spout of a faucet or the like, the faucet is entered into the mouth-like aperture formed by the washer and it is pressed thereupon, the washer yieldingly exerting a pressure on the spout of the faucet to hold the cup-shaped member 1 and its attached parts to the spout of the faucet as shown in Fig. 1 or attached to the spout of the mixing valve as shown in Fig. 6.

When it is desired to attach the apparatus to faucets delivering hot and cold water in a lavatory or the like as shown in Fig. 1, branch connections 14 and 15 are connected to the cup-shaped member 1 and mixed within the chamber 16 and delivered from the chamber mixed to the required temperature by a pipe or faucet 17 to the cup-shaped member 1. Conventional valves A and B are used to mix the cold and hot water and to regulate the temperature of the liquid. When connecting the apparatus to the mixing valve 18, the apparatus is connected to a spout 19 thereof. The valves 20 and 21 provide for mixing and changing the temperature of the liquid delivered. The hot and cold water supply is indicated by referece letters C and D.

The aperture 9 formed in the spherical body 7 is interiorly screw-threaded to receive the screw-threaded end of a tubular member 22, thereby providing means for threadably connecting the tubular member to the spherical body 7. A supporting pin 23 is secured to the tubular member 22, passing across the interior thereof to provide a support for an expansible spring 24. The spring 24 supports a ball valve 25 on its upper end. The spring 24 is supported on the pin 23 which is compressed, so as to exert pressure of the ball valve against the valve seat 11 to normally but yieldingly close the valve and prevent passage of liquid therethrough.

An aperture 26 is provided in the spherical member 7 to communicate and intersect with the aperture 8 in the spherical body 7. A counterbore is provided in the spherical body 7 connected with the aperture 26 and is interiorly screw-threaded to receive the screw-threaded end of a nipple 27. A flexible hose 28 or the like is fitted to the periphery of the nipple 27 and securely held thereto by a band fastener 29 which is provided with an inwardly extending flange 30 at one end thereof.

It will be noted that the spring 24 can be made of different gauges of spring wire to increase or decrease its tension or pressure upon the ball valve, as desired and required for maintaining a pre-determined pressure on the ball valve.

The above describes the means for fastening the apparatus to the spout of the faucet, means for regulating and controlling the pressure of the liquid delivered from the faucets and means for by-passing a portion thereof to the flexible hose or the like 28.

The operation thereof will be described hereinafter.

The means employed for automatically preventing the flow of water or other liquid to the nozzle and means for permitting the flow of water to and through the nozzle by manual operation will now be described with especial reference to Fig. 3.

A body member 31 is provided and preferably made spherical in form. The body member has an aperture 32 provided therein of pre-determined depth leaving a margin of stock 33 which is screw-threaded to receive the screw-threaded end of a nipple 34. One end of a flexible hose 28 or the like is fitted over the nipple 34 and securely fastened thereon by a band fastener 35 which is provided with an inwardly extending flange 36 at one end.

A tubular plug 37 is provided having a portion thereof 38 screw-threaded to engage the screw-threads in the stock 33 and it is provided with a head 39, so that when the plug is screwed to its place, the head will contact with the body 31 over the aperture 32 formed in said spherical member 31. The end of the tubular plug 37 is provided with a valve seat 40.

The tubular plug 37 between the screw-threaded end and the head thereof as shown at 41 is made less in diameter than the aperture 32, leaving an annular space 42 between the aperture 32 and reduced portion 41 of the plug. At a point adjacent to the screw-threaded end of the tubular plug, apertures 43 are formed in alinement with each other. Another aperture 44 is formed in the body member 31 concentric with the apertures 43.

The body member 31 is counterbored as shown at 45 concentric with the aperture 44 and is screw-threaded to receive the screw-threaded end of a preferably rigid curved member 46 for insertion into a cavity or the like. A valve 47, having the stem 48 thereof screw-threaded, is fitted within the tubular member and is adapted to contact with the valve seat 40. The tubular plug is counterbored leading to the valve seat to form a shoulder 49 and is adapted to support an expansible coiled spring 50. The usual packing is provided and held in place by a washer and the spring 50 (not shown in the drawing).

The screw-threaded end of the valve stem 48 is threadably connected to a push button 51 and one end of the expansible coiled spring 50 exerts a pressure or tension against the end of the hub 52 of the push button, normally forcing the valve 43 in contact with the seat 40, thereby automatically preventing any flow of water or other liquid to the rigid curved member 46. The pressure of the liquid flowing through the nipple 34 also exerts its pressure against the valve 33 to keep it closed.

The lower end of the tubular plug is bored larger in diameter than the valve stem 48, leaving an annular space 53 surrounding the valve stem so as to permit communication between the space and the apertures 43 formed in the plug member and the aperture 44 formed in the body member 31, thereby permitting the flow therethrough of water or other liquid through the nipple 34 and flexible hose 28.

The above describes the construction of the valve mechanism to prevent or permit the flow of liquid from the source of supply.

It will be noted that this valve is located at a point that is convenient to the user to operate and deliver the liquid to the place desired.

The end of the curved member 46 is screw-threaded and is adapted to be threadably connected preferably to a spherical member 54. A plurality of hemi-spherical protuberances 55 are provided on the spherical member 54 and provided with apertures 56 which are formed therein in angular relation to each other. The hemi-spherical protuberances are arranged in spaced apart relation to each other as shown at 57. A hemi-spherical protuberance 58 is also provided on the end of the spherical member 54 and is provided with apertures 56 which are formed therein in angular relation to each other.

The spherical member 54 and the hemi-spherical protuberances 55 provide a nozzle to permit the flow of liquid therethrough from different directions and in angular relation with respect to each other and it also provides a plurality of jets or flow of liquid through the end of the nozzle in a forward direction.

The operation of the apparatus is brief is as follows:

The apparatus is attached through the medium of the cup-shaped members 1 to valves A and B, which are regulated to change or vary the temperature of the water or liquid passing through the spout 17, as shown in Fig. 1, or in the event that the mixing valve is used, one of the cup-shaped members 1 is attached to the faucet 19 of the valve body 18. The temperature of the water is controlled and regulated in the mixing valve by manipulating the valves 20 and 21.

Water or other liquid under pressure is delivered to the cup-shaped member 1 from the domestic water works, plant or the like and exerts its pressure upon the ball valve 25. The spring 24 exerts a pre-determined pressure against the ball to keep same seated and closed. The water that is delivered to the cup-shaped member 1 flows through the aperture 26, nipple 27 and flexible hose 28 until the pressure on the valve exceeds the pre-determined pressure desired as controlled by the spring 24. As the pressure increases in the cup-shaped member 1 and on the valve, the ball valve is forced from its seat, allowing the water or other liquid to flow through the valve and out through the tubular member 22 relieving the pressure thereon, thereby maintaining the pressure of the water that flows to and through the flexible tube or hose 28 at the pre-determined pressure, that is as governed and controlled by the strength or pressure of the spring 24.

The water or other liquid under pressure flows through the tubular member 28 in contact with the valve 47 aiding to maintain the valve against its seat 40 assisted by the spring 50. It will be noted that the water and spring maintain the valve in close contact with the seat automatically and prevents the flow of water or other liquid through the valve mechanism.

When the user desires to permit the continuous and constant flow of water under pressure to the curved member 46, thence out through the nozzle formed by the spherical member 54 and protuberances 55, the user presses the push button 51 inwardly, thereby forcing the valve from its seat and allowing the water to pass from the space 33 through the apertures 43 and through the space 42 out through the aperture 44 to the curved member 46 and thence through the nozzle spraying out therefrom through the angular apertures 56 formed in the protuberances 55 thereof.

It will be understood that while the apparatus is being used for irrigating and cleansing purposes in cavities in the body, that the spherical member comprising the nozzle is inserted into the cavities thereof through the medium of the rigid curved member 46, or held in close proximity to the affected parts of the body.

When the user does not desire any further flow of water or liquid, pressure is released from the push button 51 and water or other liquid under pressure flowing through the valve 47 is automatically cut off by the spring 50 and the pressure of the water.

The apertures 56 formed in the protuberances 55 of the nozzle provide a means of projecting the water or other liquid under pressure in different angular relations to each other and forward, as they are formed therein at an angle to each other.

It will be noted that the apparatus provides means for performing a douche operation with a pre-determined pressure of liquid and constant and continuous flow thereof at the will of the operator. It will also be noted that the apparatus can be used for irrigating abdominal cavities or other cavities in the body and also provides for irrigating any part of the body or cavities thereof affected, that requires for sanitary purposes thorough cleansing of the parts of the body by supplying a continuous flow of the liquid under a pre-determined pressure.

Attention is called to the fact that the back pressure of the water flowing into cavities of the body is relieved by and passes out between the spaces 57 of the spherical member 54, forming part of the nozzle.

I claim:

1. In a combined liquid pressure controller and sanitary apparatus, a cup-shaped member to be removably connected to an outlet from a water supply under pressure, a syringe terminal, a conduit leading from the cup-shaped member to the syringe terminal, and a relief valve arranged beyond the connection of the conduit and cup-shaped member and in direct line with the flow from the water supply outlet, and an outlet from said cup-shaped member controlled by the relief valve.

2. In a sanitary apparatus, a cup-shaped member designed to be connected to a faucet, a body into which the cup-shaped member opens, a service conduit leading from the body and connected to the cup-shaped member through the body, an outlet pipe removably connected with the body in direct line with the faucet inlet to the cup-shaped member, and a spring-pressed valve in direct line with the fluid delivery from the faucet and controlling the body-connected end of said outlet.

3. In a sanitary apparatus, a cup-shaped member to be removably connected to a faucet, a fluid pipe in communication with such member, a relief valve arranged beyond such communication and in direct line with the faucet flow, a syringe section in communication with the fluid pipe, and a manually operable valve controlling such communication, said valve being automatically closed on release of manual pressure and held in closed relation by the fluid pressure in the fluid pipe.

In testimony whereof I affix my signature.

ARTHUR TOD WATSON.